United States Patent [19]

Beears

[11] 3,742,032
[45] June 26, 1973

[54] N,N'ALKYLENEBIS[β-(ALKYL-CARBOXYALKYLTHIO)PROPIONAMIDES
[75] Inventor: Warren L. Beears, Brecksville, Ohio
[73] Assignee: The B. F. Goodrich Company, New York, N.Y.
[22] Filed: Apr. 23, 1971
[21] Appl. No.: 137,052

Related U.S. Application Data
[62] Division of Ser. No. 873,651, Nov. 3, 1969, abandoned.

[52] U.S. Cl...... 260/481 R, 260/45.8 N, 260/45.85, 260/248 NS
[51] Int. Cl............................................. C07c 149/20
[58] Field of Search ................................. 260/481 R

[56] References Cited
UNITED STATES PATENTS
3,165,552  1/1965  Lovett et al..................... 260/481 R Primary Examiner—Lorraine A. Weinberger
Assistant Examiner—John F. Tenapane
Attorney—J. Hughes Powell, Jr.

[57] ABSTRACT

Alkylcarboxyalkylthio propionamides are effective stabilizers for polyolefins. N,N'-methylene-bis[β-(alkylcarboxyalkylthio)propionamides] and hexahydro-1,3,5-tris[β-(alkylcarboxyalkylthio)propionyl]-s-triszines are particularly useful stablizers for polyethylene and polypropylene. The present alkylcarboxyalkylthio propionamides behave synergistically in combination with phenolic stabilizers derived from isocyanurates and 1,3,5-triazines.

5 Claims, No Drawings

N,N'ALKYLENEBIS[β-(ALKYL-CARBOXYALKYLTHIO)PROPIONAMIDES

This is a division of application Ser. No. 873,651, filed Nov. 3, 1969, now abandoned.

BACKGROUND OF THE INVENTION

Certain sulfur-containing compounds serve as effective stabilizers against oxidative, thermal and photochemical degradation of polyolefins such as polyethylene and polypropylene. Thiodipropionates, for example, are effective stabilizers by themselves and in combination with other stabilizers.

It would be advantageous to obtain high molecular weight thio-compounds which are effective stabilizers for polyolefins. Additionally, it would be desirable to obtain compounds containing a plurality of the effective stabilizing sulfur-containing functional group.

SUMMARY OF THE INVENTION

Novel alkylcarboxyalkylthio propionamides containing a plurality of thio groups have now been discovered and are highly effective stabilizers for polyolefins, especially when employed in combination with a phenolic stabilizer. Methylenebis(alkylcarboxyalkylthio propionamides) and hexahydro-1,3,5-tris(alkylcarboxyalkylthio propionyl)-s-triazines are particularly useful employed in the range between about 0.01 and 5 percent by weight of the total composition. Employed in combination with phenolic stabilizers derived from isocyanurates and 1,3,5-triazines, and exceptional synergistic effect is obtained. Particularly effective stabilization of polyethylene and polypropylene is observed when methylenebis(alkylcarboxyalkylthio propionamide) or hexahydro-1,3,5-tris(alkylcarboxyalkylthio propionyl)-s-triazine is combined with a tris(3-alkyl-4-hydroxy-benzyl)isocyanurate in essentially a 1:1 weight ratio.

DETAILED DESCRIPTION

This invention relates to a new class of compounds effective for the stabilization of polyolefins, particularly polyethylene and polypropylene. The present compounds are alkylcarboxyalkylthio propionamides and more specifically bis- or tris-alkylcarboxyalkylthio propionamides. The compounds contain a plurality of groups of the structural formula

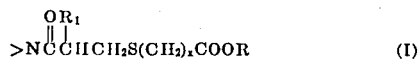

wherein $R_1$ is hydrogen or a methyl radical, $x$ is an integer from 1 to 9 and $R$ is an alkyl radical, branched or straight chain, containing from one to 25 carbon atoms. The alkylene radical may be either straight chain or branched chain.

The specific bis-alkylcarboxyalkylthio propionamides have the nitrogen atom of formula (I) bonded through a methylene (—CH$_2$—) or other alkylene —(CH$_2$)$_x$— radical containing up to eight carbon atoms.

The remaining valency of the nitrogen atom is satisfied with a hydrogen atom. The specific bis-alkylcarboxyalkylthio propion-amides have the formula

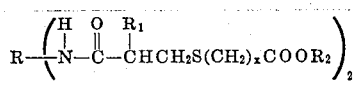

wherein $R$ is an alkylene radical containing one to 8 carbon atoms, $r_1$ is selected from hydrogen or a methyl group and $x$ is an integer from 1 to 9, and $R_2$ is an alkyl radical containing 12 to 20 carbon atoms. Excellent results have been obtained with bis-alkylcarboxyalkylthio propionamides having the structural formula

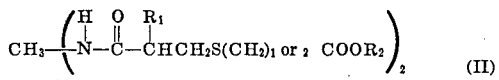

where $R_2$ is an alkyl radical containing from 12 to 20 carbon atoms. Compounds corresponding to the structural formula (II) include: N,N'-methylene-bis[β-(n-dodecyl-2-carboxyethylthio) propionamide], N,N'-methylene-bis[β-(n-dodecylcarboxymethyl-thio)propionamides], N,N'-methylene-bis[β-(n-dodecyl-2-carboxy-ethylthio)-α-methylpropionamide], N,N'-methylene-bis[β-(n-dodecylcarboxymethylthio)-α-methylpropionamide], N,N'-methy-lene-bis-[hexadecyl-2-carboxyethylthio)propionamide], N,N'-methylene-bis[hexadecylcarboxymethylthio)propionamide], N,N'-methylene-bis[β-(octadecyl-2-carboxyethylthio)propionamide], N,N'-methylene-bis[β-(octadecyl-2-carboxyethylthio)-α-methylpropionamide], N,N'-methylene-bis[β-(octadecylcarboxymethyl-thio)-α-methylpropionamide], and the like.

Other useful tris-alkylcarboxyalkylthio compounds are those where the nitrogen atom of formula (I) is a member of a 1,3,5-triazine ring. With the 1,3,5-triazine-based compounds, three groups of formula (I) can be present. Effective stabilizers are obtained, however, if only two groups of the formula (I) are present. Highly effective stabilizers derived from 1,3,5-triazine correspond to the formula

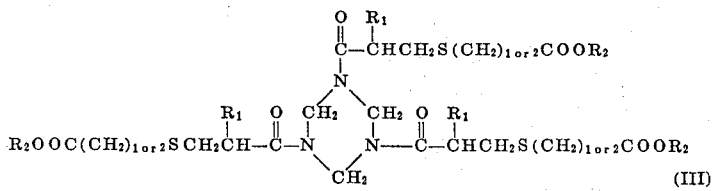

wherein $R_1$ and $R_2$ are the same as defined above. Such compounds include: hexahydro-1,3,5-tris[β-(n-dodecyl-2-carboxy-ethylthio)propionyl]-s-triazine, hexahydro-1,3,5-tris[β-(n-dodecylcarboxymethylthio)propionyl]-s-triazine, hexahydro-1,3,5-tris[β-(n-dodecyl-2-carboxyethylthio)-α-methylpropionyl]-s-triazine, hexahydro-1,3,5-tris[β-(n-dodecylcarboxymethylthio)-α-methylpropionyl]-s-triazine, hexahydro-1,3,5-tris[β-tetradecyl-2-carboxyethylthio)propionyl]-s-triazine, hexahydro-1,3,5-tris[β-(hexadecyl-2-carboxyethylthio)propionyl]-α-triazine, hexahydro-1,3,5-tris[β-(octadecyl-2-carboxyethylthio) propionyl]-s-triazine, hexahydro-1,3,5-tris[β-(octadecylcarboxymethylthio)propionyl]-s-triazine, hexahydro-1,3,5-tris [β-(octadecyl-2-carboxyethylthio)-α-methylpropionyl]-s-triazine, hexahydro-1,3,5-tris[β-(octadecylcarboxymethylthio)-α-methylpropionyl]-s-triazine, and the like.

Compounds of the formulae (II) and (III) are conveniently prepared by reacting the ester of a mercapto acid with a compound containing acrylyl- or methacrylyl-substitution. For example, to obtain compounds of type (II), 2 mols of the ester of the mercapto acid are reacted with 1 mol methylene bis-acrylamide. To obtain compounds of type (III), 3 mols of an ester of a mercapto acid are reacted with 1 mol of the acrylyl- or methacrylyl-substituted s-triazine. The reactions are generally conducted in a solvent medium with a basic catalyst. The catalyst can be an alkali or alkaline earth metal hydroxide or quaternary ammonium hydroxide such as trimethylbenzyl ammonium hydroxide or tetramethyl ammonium hydroxide. Other basic compounds including amines such as triethylamine and alkali metal alkoxides such as sodium methoxide may also be employed to catalyze the reaction. The reaction is generally conducted at an elevated temperature generally not exceeding about 70° C. To avoid undue polymerization of the acrylyl or methacrylyl groups a small amount of a conventional polymerization inhibitor can be added to the reaction mixture. The alkylcarboxyalkylthio propionamides are readily recovered from the reaction mixture using conventional techniques. The examples will more clearly illustrate the process for preparing the present compounds.

The alkylcarboxyalkylthio propionamides are useful stabilizers for olefin polymers. Although polypropylene and polyethylene are most advantageously stabilized, the present compounds are equally effective to stabilize other polyolefins derived from α-olefins containing up to about eight carbon atoms such as poly-4-methylpentene-1, polybutene and the like. They are also useful to stabilize polyolefin copolymer compositions such as ethylene-propylene copolymers. Physical mixtures of olefin homopolymers and copolymers are also stabilized according to the present invention. The polyolefins may be of high density, medium density or low density. About 0.01 percent to about 5 percent by weight of the stabilizer based on the total stabilized composition is normally employed. Excellent stabilities are observed when about 0.1 percent to about 3 percent by weight of the stabilizer is used.

The alkylcarboxyalkylthio propionamides impair oxidative deterioration as well as thermal degradation and degradation resulting from photochemical exposure which occurs during the manufacture, processing or use of the polyolefin. Such degradation generally causes a loss in the dielectric properties, discoloration, embrittlement and a decrease in other physical properties of the polymer. The present stabilizer compounds are highly effective to reduce the adverse effects caused by degradation. The polyolefinic materials stabilized with the compounds of this invention are useful for thermoplastic molding and coating applications as well as having a wide variety of other applications well known to the art.

The stabilizer compounds of this invention are readily incorporated by conventional methods into the polyolefin and generally require no special processing. They are added to the polymers by mixing on a mill or in a Banbury mixer and they may be added, alone in a suitable solvent or masterbatched with other ingredients, to a solution of the polymer. The ready solubility of these compounds in a wide variety of organic solvents facilitate their use in solution and also renders them compatible with most oils and lubricants. They can be used with other compounding ingredients such as processing oils, plasticizers, lubricants, fillers, reinforcing agents and the like. They are also compatible with other known oxidative stabilizers, color and heat stabilizers, ultraviolet absorbers and the like.

In addition to the stabilization of polyolefins the present compounds are also useful to stabilize other polymer compositions, oils, lubricants, saturated and unsaturated hydrocarbons and like materials which are subject to oxidative attack. Polystyrene, for example, or copolymers of butadiene and styrene may be stabilized with the present compounds. Also effectively stabilized are various types of lubricating oils, fatty materials such as the oils of animal and vegetable origin, gasoline, mineral oil, diesel oil, drying oils and resins.

Although the present bis- and tris-alkylcarboxyalkylthio propionamides are useful stabilizers for polyolefins when employed by themselves, particular advantage is obtained when at least one of these compounds is employed in combination with another phenolic stabilizer compound. The phenolic stabilizers will contain one or more hindered phenol groups substituted on a six-membered nitrogen-containing heterocyclic ring structure. Although enhanced activity is observed when the alkylcarboxyalkylthio propionamides are combined with conventional phenolic stabilizers, a very marked and unexpected increase in stabilization over these combinations is obtained when the phenolic stabilizer is one derived from an isocyanurate or 1,3,5-triazine. The heterocyclic nucleus will contain three alternating nitrogen heteroatoms, that is, in the 1,3 and 5 ring positions. When phenolic-substituted isocyanurates or 1,3,5-triazines are used in combination with the alkylcarboxyalkylthio propionamide compounds, the stabilization achieved far surpasses that obtained with either compound alone at the same level or the sum of the individual stabilizer compounds when employed alone. A completely unexpected improvement in the stability of the olefin polymers is realized, sometimes even exceeding ten times that obtained with either compound alone under the same conditions.

The phenolic substitutents are preferably 4-hydroxyaryl groups containing one or two alkyl substituents immediately adjacent (ortho) to the hydroxyl group. The alkyl groups will generally contain from about one to 18 carbon atoms and more preferably will be tertiary alkyl groups containing from four to 12 carbon atoms. 2,6-Di-tertiary-butyl-4-hydroxyphenyl substituted compounds are particularly advantageous for the present invention.

Substitution of the phenolic group onto the isocyanurate or 1,3,5-triazine rings may be made through a variety of linkages. For example, the phenolic moiety may be bonded to a carbon atom of the heterocyclic nucleus through an oxygen atom, a sulfur atom, an imino or substituted imino group, a carboxyl group, an alkylene group and the like, or any combination thereof. In a similar manner the phenolic substituent can be bonded to the heterocyclic nucleus through the nitrogen atom of the ring. The latter is especially advantageous with isocyanurates. In either instance, however, one, two or three phenolic moieties may be substituted.

Particular advantage is realized when the alkylcarboxyalkylthio propionamides are employed in combination with hydroxyphenylalkyleneyl isocyanurates of the general formula

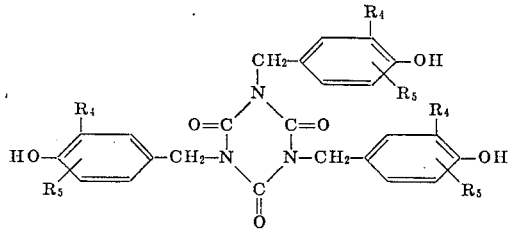

wherein $R_4$ is an alkyl group containing from one to 18 carbon atoms and more preferably a tertiary alkyl group containing from four to eight carbon atoms, $R_5$ is hydrogen or an alkyl group containing from one to 18 carbon atoms and preferably a tertiary alkyl group containing four to eight carbon atoms positioned ortho to the hydroxyl group. Such compounds include: tris-(3-methyl-4-hydroxybenzyl)isocyanurate, tris-(3-t-butyl-4-hydroxybenzyl) isocyanurate, tris-(3-t-amyl-4-hydroxybenzyl)isocyanurate, tris-(3-octyl-4-hydroxybenzyl)isocyanurate, tris-(3,5-dimethyl-4-hydroxybenzyl)isocyanurate, tris-(3,5-diisopropyl-4-hydroxybenzyl)isocyanurate, tris-(3-cyclohexyl-4-hydroxybrozyl)isocyanurate, tris-(3,5-di-t-butyl-4-hydroxybenzyl)isocyanurate, tris-(3-t-butyl-5-t-amyl-4-hydroxybenzyl)isocyanurate, tris-(3,5-di-t-amyl-4-hydroxybenzyl)isocyanurate, tris-[3,5-di-(1-methyl-1-ethylpropyl)-4-hydroxybenzyl]isocyanurate, tris-[3,5-di-(1,1,2,2-tetramethylpropyl)-4-hydroxybenzyl]isocyanurate, tris-[3,5-di-(1,1-dimethylpentyl)-4-hydroxybenzyl]isocyanurate and the like. Also useful are mono- and di-substituted isocyanurates such as bis-(3-methyl-4-hydroxybenzyl) isocyanurate, bis-(3-t-butyl-4-hydroxybenzyl)isocyanurate, bis-(3,5-dimethyl-4-hydroxybenzyl)isocyanurate, bis-(3,5-di-t-butyl-4-hydroxybenzyl)isocyanurate, 3-methyl-4-hydroxybenzyl isocyanurate, 3-t-butyl-4-hydroxybenzyl isocyanurate, 3,5-dimethyl-4-hydroxybenzyl isocyanurate, 3,5-di-t-butyl-4-hydroxybenzyl isocyanurate, bis-(3-methyl-4-hydroxybenzyl)hexyl isocyanurate, bis-(3-t-butyl-4-hydroxybenzyl)hexyl isocyanurate, bis-(3,5-di-t-butyl-4-hydroxybenzyl)hexyl isocyanurate, bis-(3,5-di-t-butyl-4-hydroxybenzyl)octadecyl isocyanurate, as well as other structurally related isocyanurates which are more fully described in copending applications Ser. Nos. 770,863, now U.S. Pat. No. 3,531,483, and 770,846, now U.S. Pat. No. 3,598,815.

In addition to the above-mentioned phenolic-substituted isocyanurates, synergistic activity is observed when the bis- and tris-alkylcarboxyalkylthio propionamides are combined with 4-hydroxyaryl-substituted s-triazines such as: hexa-hydro-1,3,5-tris[β-(3,5-di-t-butyl-4-hydroxyphenyl)propionyl]-s-triazine, hexahydro-1,3,5-tris[β-(3,5-di-t-amyl-4-hydroxyphenyl)propionyl]-s-triazine, hexahydro-1,3,5-tris[β-(3-t-butyl-5-t-amyl-4-hydroxyphenyl)propionyl]-s-triazine, hexa-hydro-1,3,5-tris[β-(3,5-di-1-methyl-1-ethylpropyl-4-hydroxy-phenyl)propionyl]-s-triazine, hexahydro-1,3,5-tris[β-(3,5-di-1,1,2,2-tetramethylpropyl-4-hydroxyphenyl)propionyl]-s-tri-azine, hexahydro-1,3,5-tris[β-(3,5-di-1,1-dimethylpentyl-4-hydroxyphenyl)propionyl]-s-triazine, hexahydro-1,3,5-tris[β-(3,5-di-t-butyl-4-hydroxyphenyl)-α-methylpropionyl]-s-triazine, hexahydro-1,3,5-tris[β-(3,5-di-t-amyl-4-hydroxyphenyl)-α-methylpropionyl]-s-triazine, hexahydro-1,3,5-tris[β-(3,5-di-t-butyl-4-hydroxyphenyl)butyryl]-s-triazine, hexahydro-1,3,5-tris[γ-(3,5-di-t-butyl-4-hydroxyphenyl)butyryl]-s-triazine, 6-(4-hydroxy-3,5-di-t-butylanilino)-2,4-bis-(n-octylthio)-1,3,5-triazine, 6-(4-hydroxy-3,5-di-t-butylanilino)-2,4-bisphenylthio-1,3,5-triazine, 6-(4-hydroxy-3,5-di-t-butylanilino)-2,4-bis-(octadecylthio)-1,3,5-triazine, 6-(4-hydroxy-3,5-di-t-butylanilino)-2,4-bis-cyclohexylthio-1,3,5-triazine, 6-(2-hydroxy-3,5-di-t-butyl-6-methylanilino)-2,4-bis-(n-octylthio)-1,3,5-triazine, 6-(4-hydroxy-3,5-di-t-butylanilino)-2,4-bis-(2,3-dimethylphenylthio)-1,3,5-triazine, 6-(4-hydroxy-3,5-di-t-butylanilino)-2,4-bis-(carbo-n-lauryloxyethylthio)-1,3,5-triazine, 6-(4-hydroxy-3,5-di-t-butylanilino)-2,4-bis-(4-t-octylphenoxy)-1,3,5-triazine, 6-(4-hydroxy-3,5-di-t-butylanilino)-2,4-bis-(2-carbo-n-lauryloxyphenylthio)-1,3,5-triazine, 6-(4-hydroxy-3,5-di-t-butyl-N-benzylanilino)-2,4-bis(n-octylthio)-1,3,5-triazine, 6-(4-hydroxy-3,5-di-t-butylanilino)-4-n-octylthio-2-chloro-1,3,5-triazine, 4,6-bis-(4-hydroxy-3,5-di-t-butylanilino)-2-chloro-1,3,5-triazine, 6-(4-hydroxy-3,5-di-t-butylphenoxy)-2,4-bis-(phenoxy)-1,3,5-triazine, 2,4,6-tris-(4-hydroxy-3,5-di-t-butylphenoxy)-1,3,5-triazine, 6-(4-hydroxy-3,5-di-t-butylphenoxy)-2,4-bis-(n-octylthioethylthio)-1,3,5-triazine, 6-(4-hydroxy-3,5-di-t-butylphenoxy)-2,4-dichloro-1,3,5-triazine, 6-(4-hydroxy-3,5-di-t-butylphenoxy)-2,4-bis-(n-octylthiopropylthio)-1,3,5-triazine, 2,4,6-tris-(4-hydroxy-3-methyl-5-t-butylphenoxy)-1,3,5-triazine, 2,4-bis-(4-hydroxy-3,5-di-t-butylphenoxy)-6-dodecylamino-1,3,5-triazine, 2,4-bis-(4-hydroxy-3,5-di-t-butylphenoxy)-6-amino-1,3,5-triazine, 2,4-bis-(4-hydroxy-3,5-di-t-butylphenoxy)-6-(n-octylthio)-1,3,5-triazine, 2,4-bis-(4-hydroxy-3,5-di-t-butylphenoxy)-6-(n-octylthiopropylthio)-1,3,5-triazine, 6-(4-hydroxy-3,5-di-t-butylphenylthio)-2,4-bis-(ethylthio)-1,3,5-triazine, 6-(4-hydroxy-3,5-di-t-butylphenylthio)-2,4-bis-(phenylthio)-1,3,5-triazine, 6-(4-hydroxy-3,5-di-t-butylphenylthio)-2,4-bis-in-octylamino)-1,3,5-triazine, 6-(4-hydroxy-3,5-di-t-butylphenylthio)-2,4-bis-(n-octyloxy)-1,3,5-triazine, 6-(4-hydroxy-3,5-di-t-butylphenylthio)-2-mercapto-4-n-octadecylthio-1,3,5-triazine, 6-(4-hydroxy-3,5-di-t-butylphenylthio)-2,4-bis-(4-t-butylphenoxy)-1,3,5-triazine, 2,4,6-tris-(4-hydroxy-3,5-di-t-butylphenylthio)-1,3,5-triazine, 2,4-bis-(4-hydroxy-3,5-di-t-butylphenylthio)-6-(n-dodecylamino)-1,3,5-triazine, 2,4-bis-(4-hydroxy-3,5-di-t-butylphenylthio)-6-amino-1,3,5-triazine, and the like.

When employing the synergistic combinations of stabilizers described hereinabove, the total amount of the stabilizer system will be between 0.01 and 5 percent by weight based on the total stabilized composition. Excellent results have been obtained when the concentration (total) of stabilizer components is between about 0.1 and 2 percent by weight based on the total stabilized composition and the weight ratio of the alkylcarboxyalkylthio propionamide compound to the phenolic-substituted isocyanurate or 1,3,5-triazine is about 1:1. The weight ratio of the two components can be varied between about 5:1 and 1:5 and still obtain enhanced activity over either of the components employed individually under identical conditions.

The following Examples serve to illustrate the invention more fully. All parts and percentages are reported on a weight basis unless otherwise indicated.

PART I. PREPARATION OF ALKYLCARBOXYALKYLTHIO PROPIONATES

EXAMPLE I

Preparation of hexahydro-1,3,5-tris-[β-(n-octadecyl-carboxymethylthio)propionyl]-s-triazine. To a reactor equipped with a stirrer and condenser was charged 12.45 grams (0.05 mol) 1,3,5-triacrylylperhydro-s-triazine and 160 mls. chloroform containing 0.1 gram 2,6-di-t-butyl-p-cresol as a polymerization inhibitor. 51.6 Grams (0.15 mol) n-octadecylthio acetate and 0.6 gram of a 35 percent solution of trimethylbenzyl ammonium hydroxide in methanol were then charged and the reaction mixture heated at 50° C. under a nitrogen atmosphere for about 2 hours. The reaction mixture was cooled and acidified by the addition of 0.125 gram concentrated hydrochloric acid and the chloroform removed under reduced pressure at a temperature of about 75° C. About 63 grams of a crude white solid was obtained upon cooling. The crude light amber hexahydro-1,3,5-tris[β-(n-octadecylcarboxymethylthio)propionyl]-s-triazine was recrystallized from hexane and obtained as a white crystalline solid having a melting point of 76°–78° C. Elemental analysis, infrared analysis and nuclear magnetic resonance spectroscopy all confirmed the compound to be hexahydro-1,3,5 -tris[-β-(n-octadecylcarboxymethylthio)propionyl]-s-triazine.

EXAMPLE II

Preparation of hexahydro-1,3,5-tris[β-(n-octadecyl-2-carboxyethylthio)propionyl]-s-triazine. Employing a procedure similar to that described in Example I, 40 grams (0.112 mol) n-octadecyl-β-mercaptopropionate and 8.6 grams (0.0373 mol) 1,3,5-triacrylylperhydro-s-triazine were reacted in 150 mls. chloroform containing 0.1 gram 2,6-di-t-butyl-p-cresol and 1 gram of a 35 percent methanol solution of trimethylbenzyl ammonium hydroxide. About 100 percent yield of crude hexahydro-1,3,5-tris[β-(n-octadecyl-2-carboxyethylthio)propionyl]-s-triazine was obtained. Recrystallization of the crude reaction product from acetone yielded a product having a melting point of 70° – 71° C. Elemental analysis and the infrared spectrum corresponded with that for hexahydro-1,3,5-tris[β-(n-octadecyl-2-carboxyethylthio)propionyl]-s-triazine.

PART II. STABILIZATION OF POLYOLEFINS

The alkylcarboxyalkylthio propionamides similarly prepared were employed to stabilize polyolefins. Comparative Examples were run to demonstrate the superiority of the present compounds over several well known commercial stabilizers. All stabilizers were incorporated into the polyolefin by dissolving the stabilizer in acetone, suspending the polyolefin therein and then removing the acetone under vacuum. The stabilized polyolefin compositions were then hot milled. In the case of polyethylene and polypropylene the milling was conducted for 5 minutes at 290°–300° F. The polyolefin was then sheeted off and placed in a mold shimmed to the desired thickness. Polyethylene samples were then heated in the mold at 300° F. for 10 minutes with 150 tons pressure being applied over the last 5 minutes of heating and the samples allowed to cool in the mold under pressure. Polypropylene samples were molded at 400° F. and 4,000 psi for 2 minutes and then transferred to a cold press at 4,000 psi for a 2 minute cooling period. The samples were tested by hanging 1 × 2 inch strips in an air-circulating oven and heating at a temperature of 140° C. The samples were deemed to have failed at the first signs of crazing.

EXAMPLE III

Polypropylene was stabilized with hexahydro-1,3,5-tris[β-(n-octadecylcarboxymethylthio)propionyl]-s-triazine and a well known commercial thio compound by themselves, and in combination with several phenolic stabilizers. The amounts of

| Sample | Thio compound (parts) | Phenolic compound (parts) | Hours to failure |
|---|---|---|---|
| Unstabilized | | | 6–8 |
| A | Hexahydro-1,3,5-tris[β-(n-octadecylcarboxymethylthio)propionyl]-s-triazine (0.25). | | 25 |
| B | ...do... | Tris(3,5-di-t-butyl-4-hydroxybenzyl)isocyanurate (0.1). | 2,352 |
| C | ...do... | Tris(3,5-di-t-butyl-4-hydroxybenzyl)isocyanurate (0.25). | 2,928 |
| D | | Tris(3,5-di-t-butyl-4-hydroxybenzyl)isocyanurate (0.1). | 145 |
| E | | Tris(3,5-di-t-butyl-4-hydroxybenzyl)isocyanurate (0.25). | 250 |
| F | β-Dilaurylthiodipropionate (0.25). | Tris(3,5-di-t-butyl-4-hydroxybenzyl)isocyanurate (0.1). | 1,000 |
| G | ...do... | Tris(3,5-di-t-butyl-4-hydroxybenzyl)isocyanurate (0.25). | 1,368 |
| H | Hexahydro-1,3,5-tris-[β-(n-octadecylcarboxymethylthio)propionyl]-s-triazine (0.25). | n-Octadecyl-β-(3,5-di-t-butyl-4-hydroxyphenyl)propionate (0.1). | 768 | the stabilizers employed and the results obtained therewith are set forth in the Table. It is evident from the Table that the hexahydro-1,3,5-tris[β-(n-octadecylcarboxymethylthio)propionyl]-s-triazine is effective to prevent oxidative degradation of polypropylene. It is also shown that when the alkylcarboxyalkylthio propionamide compound is employed in combination with a phenolic isocyanurate compound, tris(3,-5-di-t-butyl-4-hydroxybenzyl)isocyanurate, synergistic activity is obtained. This synergism is even more remarkable since it is much greater than the synergistic effect obtained when well known thio compounds are employed in combination with the tris(3,5-di-t-butyl-4-hydroxybenzyl)isocyanurate or when the hexahydro-1,3,5-tris[β-(n-octadecylcarboxymethylthio)propionyl]-s-triazine is employed in combination with other well known and highly active stabilizers not derived from isocyanurates or 1,3,5-triazines.

Similar results are obtained when the hexahydro-1,3,5-tris[β-(n-octadecylcarboxymethylthio)propionyl]-s-triazine is incorporated in high density polyethylene. Synergism was obtained in polyethylene both in combination with tris(3,5-di-t-butyl-4-hydroxybenzyl)isocyanurate and also with similarly substituted 1,3,5-triazines, such as hexahydro-1,3,5-tris[β-(3,5-di-t-butyl-4-hydroxyphenyl)propionyl]-s-triazine. Polyethylene stabilized in this manner had remarkable stability upon oven aging and outdoor exposure.

EXAMPLE IV

Polypropylene was stabilized with 0.25 part hexahydro-1,3,5-tris[β-(n-octadecyl-2-carboxyethylthio)propionyl]-s-triazine as prepared in Example II. Excellent polymer stability was observed when, additionally, 0.1 part tris(3,5-di-t-butyl-4-hydroxybenzyl)isocyanurate was combined therewith. In this latter instance the samples subjected to 140° C. oven-aging withstood 2,424 hours before failure. This is again a substantial improvement over compositions tested under identical conditions but stabilized with β-dilaurylthiodipropionate or a phenolic stabilizer not derived from an isocyanurate or 1,3,5-triazine. Additionally, when the above synergistic combination was employed to stabilize poly(4-methyl-pentene-1) and an ethylene-propylene copolymer similar synergistic activity was observed.

EXAMPLE V

Employing a procedure similar to that described in Example I, methylene bisacrylamide was reacted with n-octadecylthio acetate to obtain N,N'-methylenebis[β-(n-octadecylcarboxymethylthio)propionamide] which was incorporated in polypropylene, by itself, and in combination with tris(3,5-di-t-butyl-4-hydroxybenzyl)isocyanurate and hexahydro-1,3,5-tris[β-(3,5-di-t-butyl-4-hydroxybenzyl)propionyl]-s-triazine and hexahydro-1,3,5-tris[β-(3,5-di-t-butyl-4-hydroxyphenyl)α-methylpropionyl]-s-triazine at 0.1 and 0.25 part levels. The components comprising the synergistic combinations were employed at a 1:1 weight ratio. Excellent stabilities were observed in all instances. The polypropylene stabilized in this manner exhibited superior resistance to outdoor aging as measured by color development of the samples.

In addition to the stabilizer systems employed above N,N'-methylenebis[β-(n-dodecyl-2-carboxyethylthio)-propionamide] and hexahydro-1,3,5-tris[β-(n-dodecyl-2-carboxyethylthio)α-methylpropionyl]-s-triazine were employed to stabilize polypropylene in combination with tris(3,5-di-t-butyl-4-hydroxybenzyl)isocyanurate, tris(3-methyl-4-hydroxybenzyl)isocyanurate, hexahydro-1,3,5-tris[β-(3,5-di-t-butyl-4-hydroxyphenyl)propionyl]-s-triazine and other 1,3,5-triazines substituted with various hindered phenolic groupings. The stabilization of the polypropylene was, in all instances, markedly improved over that of unstabilized polypropylene or of polypropylene containing the stabilizer components individually.

I claim:

1. An alkylcarboxyalkylthio propionamide

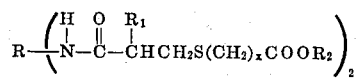

wherein $R$ is an alkylene radical containing from one to 8 carbon atoms, $R_1$ is selected from hydrogen or a methyl group, $R_2$ is an alkyl radical containing from 12 to 20 carbon atoms and $x$ is an integer from 1 to 9.

2. An alkylcarboxyalkylthio propionamide of claim 1 wherein $R_1$ is hydrogen and $x$ is 1 or 2.

3. A propionamide of claim 2 having the formula

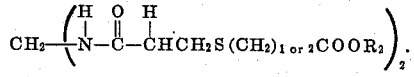

4. A propionamide of claim 3, N,N'-methylenebis[β-(n-octadecyl-carboxymethylthio)propionamide].

5. A propionamide of claim 3, N,N'-methylenebis[β-(n-dodecyl-2-carboxyethylthio)propionamide].

* * * * *